(12) United States Patent
Hacking et al.

(10) Patent No.: US 8,289,850 B2
(45) Date of Patent: *Oct. 16, 2012

(54) INTERCONNECT BANDWIDTH THROTTLER

(75) Inventors: Lance Hacking, Austin, TX (US);
Ramana Rachakonda, Austin, TX (US);
Belliappa Kuttanna, Austin, TX (US);
Rajesh Patel, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/241,738

(22) Filed: Sep. 23, 2011

(65) Prior Publication Data

US 2012/0054387 A1 Mar. 1, 2012

(51) Int. Cl.
*H04L 12/28* (2006.01)
*H04J 1/16* (2006.01)
*G08C 15/00* (2006.01)
*G06F 11/00* (2006.01)
*G01R 31/08* (2006.01)

(52) U.S. Cl. ........ 370/230; 370/252; 370/412; 370/468; 710/105

(58) Field of Classification Search .......... 370/229–259, 370/412–468; 709/223–235; 710/36–49, 710/105–109; 713/300–340
See application file for complete search history.

(56) References Cited

U.S. PATENT DOCUMENTS

| | | | | |
|---|---|---|---|---|
| 5,633,861 A * | 5/1997 | Hanson et al. | ................ | 370/232 |
| 5,798,667 A | 8/1998 | Herbert | | |
| 5,799,002 A * | 8/1998 | Krishnan | ...................... | 370/234 |
| 5,953,685 A * | 9/1999 | Bogin et al. | .................. | 702/136 |
| 6,006,264 A * | 12/1999 | Colby et al. | ................. | 709/226 |
| 6,173,217 B1 * | 1/2001 | Bogin et al. | ..................... | 700/299 |
| 6,470,238 B1 * | 10/2002 | Nizar et al. | ................... | 700/299 |
| 6,473,793 B1 * | 10/2002 | Dillon et al. | ................. | 709/223 |
| 6,961,341 B1 * | 11/2005 | Krishnan | ..................... | 370/412 |
| 6,993,045 B2 * | 1/2006 | Krishnan | ..................... | 370/468 |
| 7,079,546 B2 * | 7/2006 | Krishnan | ..................... | 370/412 |
| 7,379,857 B2 * | 5/2008 | Piesco | ............. | 703/21 |
| 7,400,632 B2 * | 7/2008 | Krishnan | ................ | 370/395.41 |
| 7,400,633 B2 * | 7/2008 | Krishnan | ................ | 370/395.41 |
| 7,403,476 B2 * | 7/2008 | Krishnan | ................ | 370/229 |
| 7,417,992 B2 * | 8/2008 | Krishnan | ................ | 370/395.41 |
| 7,680,035 B2 * | 3/2010 | Krishnan | ..................... | 370/229 |
| 7,814,349 B2 * | 10/2010 | Merkin et al. | ................ | 713/300 |
| 8,050,177 B2 | 11/2011 | Hacking et al. | | |
| 2004/0015602 A1 * | 1/2004 | Goldhammer et al. | ....... | 709/235 |
| 2004/0083372 A1 | 4/2004 | Williamson et al. | | |
| 2007/0234072 A1 | 10/2007 | Kudelski | | |
| 2008/0163226 A1 * | 7/2008 | Radhakrisnan et al. | ...... | 718/102 |
| 2008/0234957 A1 | 9/2008 | Banhegyesi et al. | | |
| 2010/0050139 A1 * | 2/2010 | Abadir et al. | ..................... | 716/5 |
| 2011/0193542 A1 * | 8/2011 | Kwok et al. | .................. | 323/284 |

OTHER PUBLICATIONS

Office Action from corresponding China application No. 200910128348.8, filed Mar. 30, 2009; Office Action mailed Feb. 2, 2012; 9 pages.

* cited by examiner

*Primary Examiner* — Man Phan
(74) *Attorney, Agent, or Firm* — Carrie A. Boone, P.C.

(57) ABSTRACT

An interconnect bandwidth throttler is disclosed. The interconnect bandwidth throttler turns off the interconnect, based on whether a maximum number of transactions has taken place within a predetermined throttle window. Both the maximum number of transactions and the throttle window are adjustable. Characteristics such as performance, thermal considerations, and average power are adjustable using the interconnect bandwidth throttler.

8 Claims, 6 Drawing Sheets

INTERCONNECT BANDWIDTH THROTTLER

CROSS-REFERENCE TO RELATED APPLICATIONS

This application claims priority to U.S. Pat. No. 8,050,177.

TECHNICAL FIELD

This application relates to interconnect traffic in a central processing unit and, more particularly, to a mechanism for controlling interconnect traffic.

BACKGROUND

Interconnect traffic between a central processing unit (CPU) and other circuitry of a system tends to occur in bursts. While it is common for the interconnect traffic to be fully utilized (e.g., at or close to 100%) for short periods of time, it is rare for the interconnect traffic to remain highly utilized for long periods of time. There may be opportunities to throttle, or turn off, the CPU when the CPU is not highly utilized.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, an interconnect bandwidth throttler is disclosed. The interconnect bandwidth throttler turns off the interconnect based on whether a maximum number of transactions has take place within a predetermined throttle window. Both the maximum number of transactions and the throttle window are adjustable.

Figure 1:
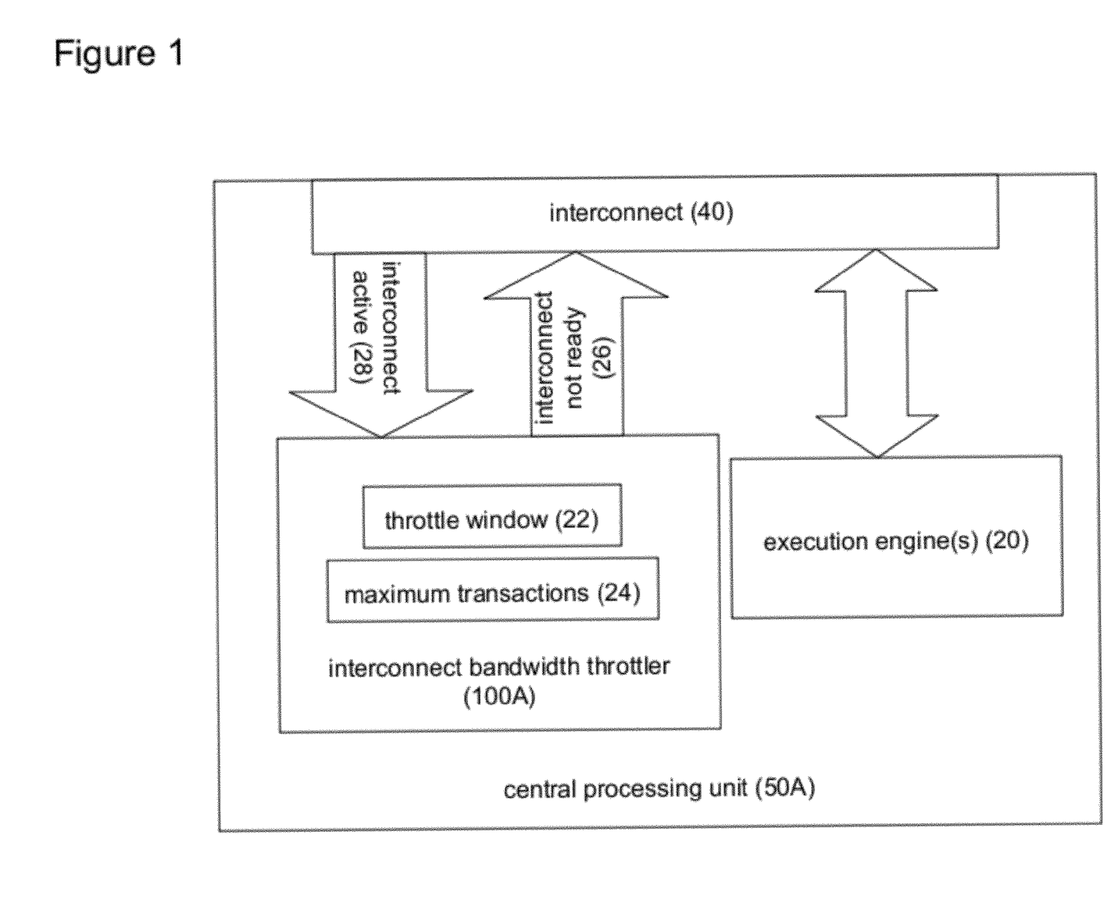
FIG. 1 is a block diagram of an interconnect bandwidth throttler, implemented internal to a central processing unit, according to some embodiments.
Figure 2:
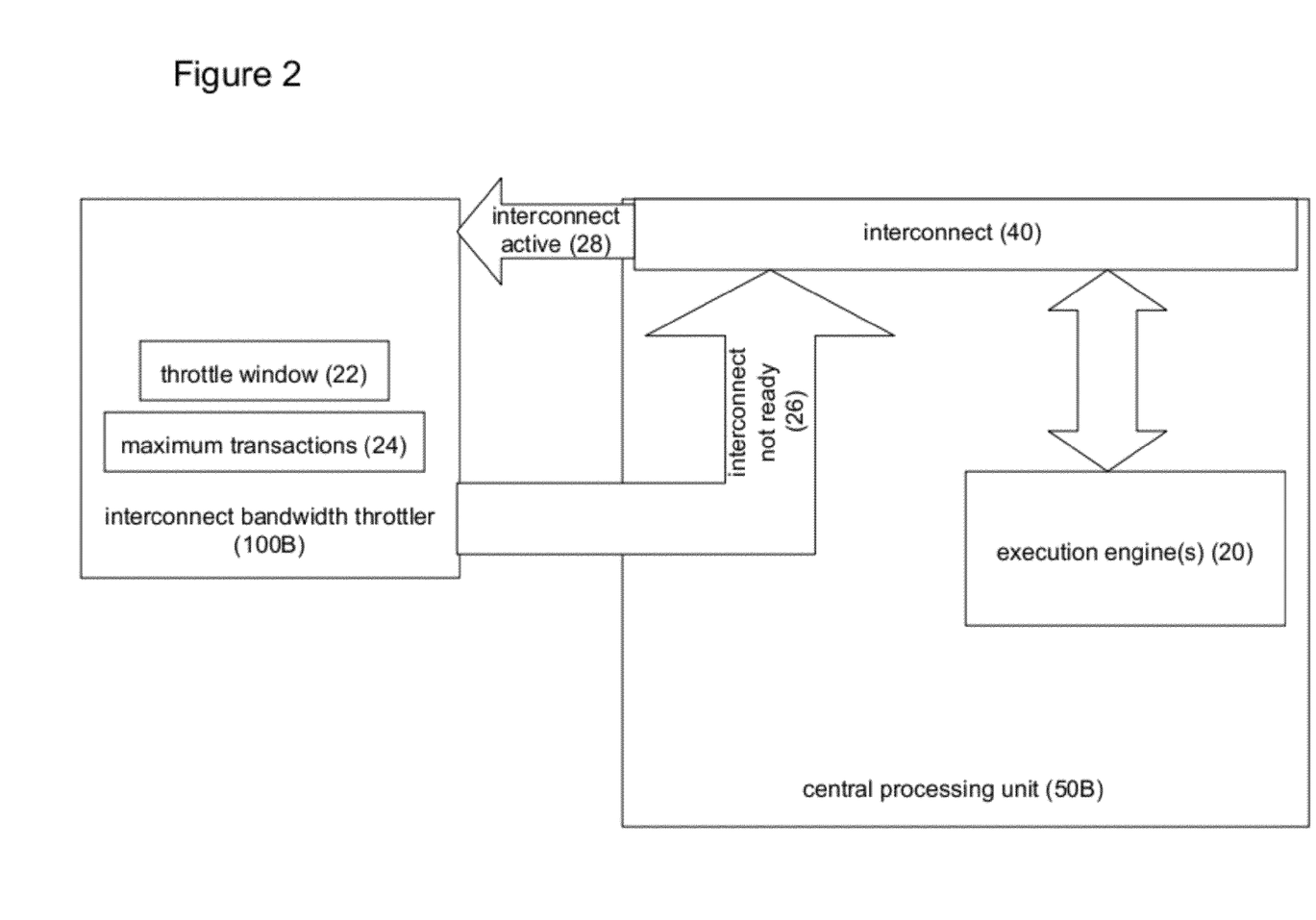
FIG. 2 is a block diagram of an interconnect bandwidth throttler, implemented external to a central processing unit, according to some embodiments.
Figure 3:
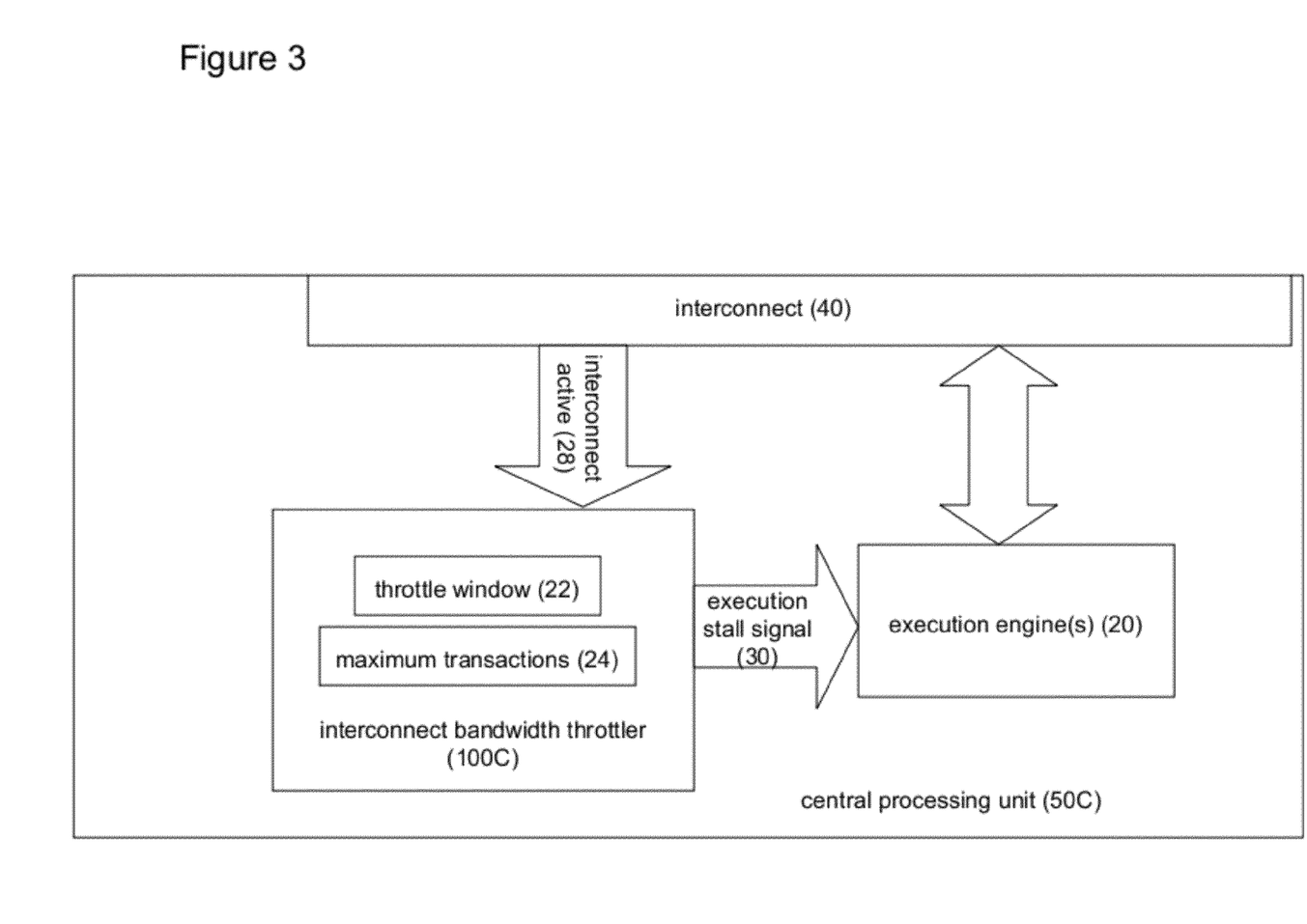
FIG. 3 is a block diagram of an interconnect bandwidth throttler, implemented to reduce interconnect bandwidth by throttling execution of one or more execution units, according to some embodiments.

FIG. 1 is a block diagram of an interconnect bandwidth throttler 100A, implemented as part of a central processing unit (CPU) 50A, according to some embodiments. FIG. 2 is a block diagram of an interconnect bandwidth throttler 100B, implemented external to a CPU 50B, according to some embodiments. FIG. 3 is a block diagram of an interconnect bandwidth throttler 100C, operable on execution engine(s) within a CPU 50C, according to some embodiments.

Any of the above implementations are further referred to herein as an interconnect bandwidth throttler 100 of a CPU 50. The interconnect bandwidth throttler 100 caps the maximum traffic on the interconnect 40. The interconnect 40 connects the CPU 50 to other parts of a system. Accordingly, the interconnect 40 may be a bus, such as a front side bus, a data bus, an address bus, and so on. The interconnect bandwidth throttler 100 selectively allows access to the CPU 50 by enabling or disabling its interconnect 40 or indirectly reduces interconnect activity by throttling the rate of processing of one or more execution units with the CPU 50.

The interconnect bandwidth throttler 100 operates using two parameters, a throttle window parameter 22 and a maximum transactions parameter 24, in deciding when to generate a command 26 to the interconnect 40, shown in FIGS. 1 and 2 as "interconnect not ready". The command 26 may be an execution stall signal (as in FIG. 3), a transaction, or a command. Where the interconnect 40 is a bus, for example, the command may be a "bus not ready" signal. The throttle window parameter 22 indicates a time period related to some indicator, such as a number of bus clocks. The maximum transactions parameter 24 indicates the number of allowed transactions within the throttle window from any agent on the interconnect 40.

In FIG. 3, the interconnect bandwidth throttler 100C sends an execution stall signal 28, not to the interconnect 40, but to one or more execution engines 20 that is connected to the interconnect. When the execution stall signal 28 is sent to an execution engine 20, the rate of processing may be reduced or stalled with the indirect effect of reducing interconnect utilization.

Figure 4:
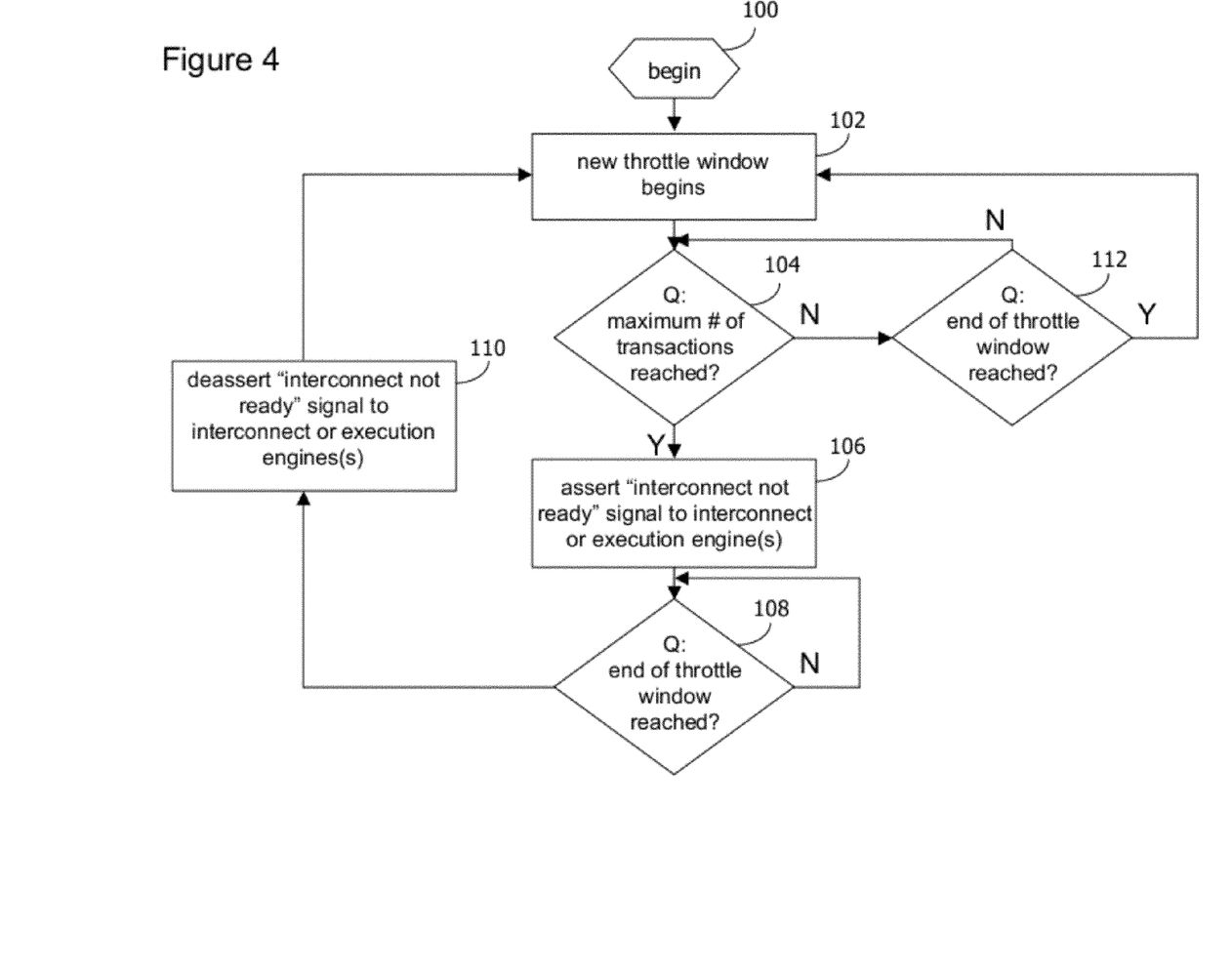
FIG. 4 is a flow diagram showing operation of the interconnect bandwidth throttler of FIG. 1, 2, or 3, according to some embodiments.

FIG. 4 is a flow diagram illustrating operations performed by the interconnect bandwidth throttler 100, according to some embodiments. At the commencement of a new throttle window (block 102), the interconnect 40 of the CPU 50 operates normally until a maximum number of transactions for the throttle window has been reached (block 104), as indicated by the maximum transactions parameter 24. In essence, the interconnect bandwidth throttler 100 is counting the transactions to the interconnect 40 during the throttle window.

While the maximum number of transactions has not been reached (the "no" prong of block 104), the transactions continue to be "counted" until the end of the current throttle window has been reached (block 112). Once the current throttle window ends, a new throttle window begins (block 102), and a new transaction count commences.

Once the maximum number of transactions has been reached, the interconnect bandwidth throttler 100 sends or asserts a command or a signal 26 (e.g., "interconnect not ready") to the interconnect 40 (block 106). Once the command or signal 26 has been sent, the interconnect 40 is unavailable for transactions. Where the interconnect bandwidth throttler 100 controls an execution engine (FIG. 3), an execution stall signal 30 is sent to one or more engines, causing processing rate to slow or halt and interconnect utilization to be reduced.

Next, the interconnect bandwidth throttler 100 checks whether the end of the throttle window has been reached (block 108), as indicated by the throttle window parameter 22. Once the time period specified in the throttle window parameter 22 has been reached, the "bus not ready" signal 26 is disabled, or deasserted, to the interconnect 40 (block 110) and a new throttle window begins (block 102). The process is thus repeated for the new throttle window.

The interconnect bandwidth throttler 100 may be internal (FIG. 1) or external (FIG. 2 or 3) to the CPU 50. The throttle window 22 and maximum transactions 24 parameters enable the throttle window size to be adjusted after the CPU 50 and throttler 100 are committed to silicon. Such adjustments may be desirable to account for performance, thermal considerations, and average power. Each of these characteristics is described below.

With respect to performance, interconnect traffic (traffic between the CPU and other circuitry of the system that use the interconnect 40) tends to occur in bursts. While it is common for the interconnect traffic to be fully utilized (e.g., at or close to 100%) for short periods of time, it is rare for the interconnect traffic to remain highly utilized for long periods of time. Thus, in some embodiments, the negative performance impact of the interconnect bandwidth throttler 100 may be reduced to a negligible amount in the vast majority of workloads by increasing the length (time) of the throttle window 22.

The temperature of an integrated circuit takes a long time to rise due to activity—generally, tens of seconds. Therefore, having a large throttle window 22 gives up very little in terms of capping the worst case thermal dissipation.

However, the average power (in terms of current/battery life, not heat) may be adversely impacted by a large throttle window 22 size. In some embodiments, any amount of throttling benefits the average power of the system.

Thus, the interconnect bandwidth throttler 100 takes advantage of these characteristics to reduce the average power and to reduce the maximum thermal dissipation of a system, with minimal impact to performance, in some embodiments. The interconnect bandwidth throttler 100 may further save battery life in the system, reduce cooling costs, and/or enable smaller form factors to be used.

Figure 5:
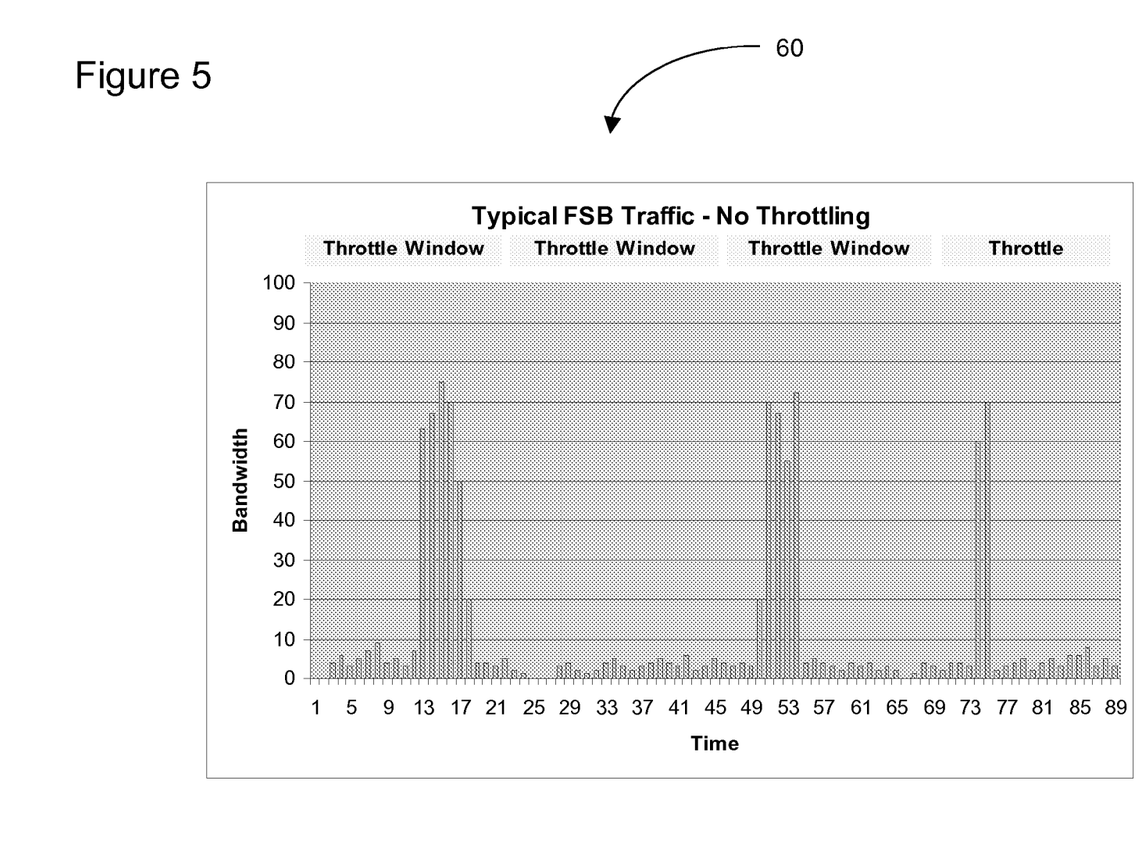
FIG. 5 is a graph showing typical interconnect traffic where no throttling occurs, according to some embodiments.
Figure 6:
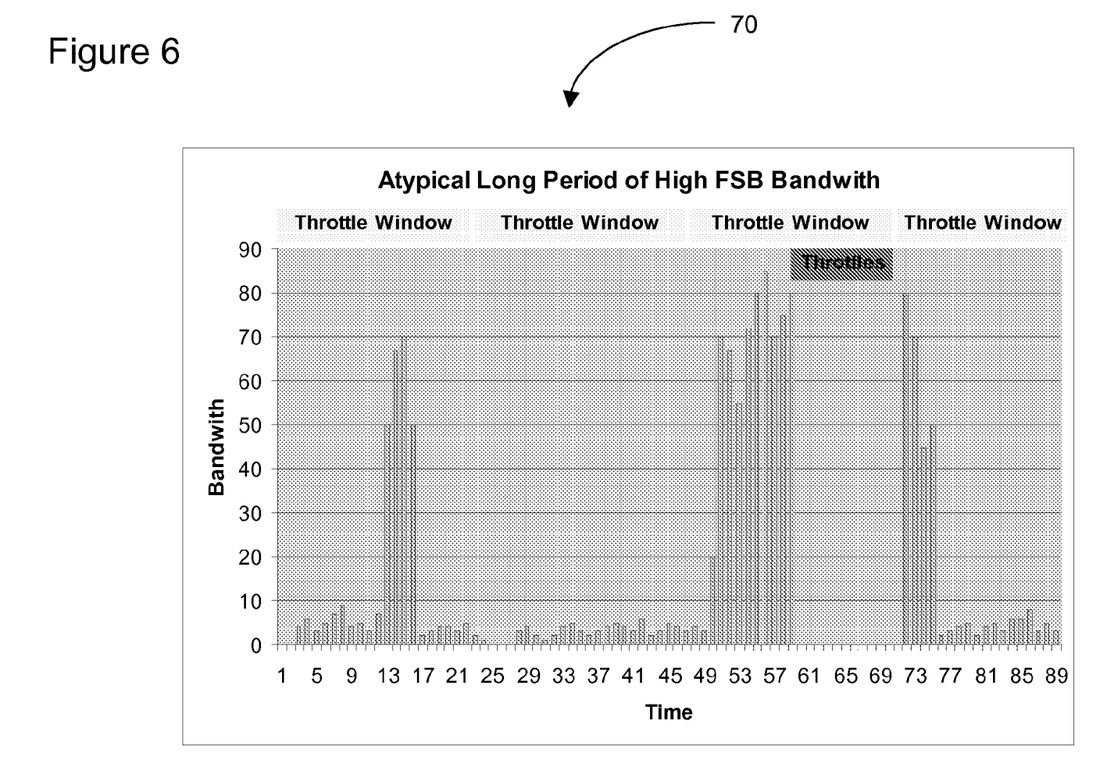
FIG. 6 is a graph showing atypical interconnect traffic, including long periods of high interconnect bandwidth, according to some embodiments.

FIGS. 5 and 6 are graphs showing time versus bandwidth of an interconnect utilizing the interconnect bandwidth throttler 100, according to some embodiments. In each figure, four throttle windows are depicted. In the graph 60 (FIG. 5), there is some activity during the first, third, and fourth throttle window, with very little activity occurring during the second throttle window, with no throttle window having enough transaction activity to trigger the interconnect bandwidth throttler 100. In the graph 70 (FIG. 6), there is also more activity in the first, third, and fourth throttle windows, as compared to the second throttle window. This time, however, there is enough transaction activity in the third throttle window to cause the interconnect bandwidth throttler 100 to throttle the bus (e.g., send a "bus not ready" signal to the interconnect). During the throttle period, the graph 70 shows that there is no activity. At the start of the fourth throttle window, transaction activity resumes.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. An interconnect bandwidth throttler, comprising:
   a command to be selectively issued to an interconnect, wherein the interconnect couples a central processing unit, operating at a first performance level, to other circuitry of a system such that the central processing unit issued transactions to the other circuitry, the system further comprising an average power;
   a throttle window parameter specifying a throttle window time period, the throttle window time period being succeeded by one or more successive throttle window time periods, wherein transactions issued on the interconnect are measured during the throttle window time period; and
   a maximum transactions parameter specifying a maximum number of transactions of the central processing unit sent to the interconnect during the throttle window time period;
   wherein the command is asserted to the interconnect when transactions to the interconnect exceed the maximum number of transactions during the throttle window time period such that the central processing unit operates at a second performance level and the average power is reduced, the second performance level being lower than the first performance level, the command being also asserted in one or more of the succeeding throttle window time periods if, during the one or more succeeding throttle window time periods, the number of transactions exceeds the maximum number of transactions.

2. The interconnect bandwidth throttler of claim 1, wherein the command is deasserted to the interconnect when the throttle window time period has passed.

3. The interconnect bandwidth throttler of claim 1, wherein the interconnect is a front side bus and the command is a bus not ready signal.

4. An interconnect throttler, comprising:
   an execution stall signal or interconnect not ready signal to be selectively asserted to an interconnect, wherein the interconnect couples a central processing unit to other circuitry of a system, the central processing unit comprising a first thermal characteristic and a first average power;
   a throttle window parameter specifying a throttle window time period, wherein transactions issued on the interconnect are counted during the throttle window time period; and
   a maximum transactions parameter specifying a maximum number of transactions to the interconnect during the throttle window time period;
   wherein the execution stall signal or interconnect not ready signal is asserted when transactions to the interconnect exceed the maximum number of transactions during the throttle window time period such the central processing unit operates at a second thermal characteristic and a second average power, the second thermal characteristic being lower than the first thermal characteristic and the second average power being lower than the first average power.

5. The interconnect throttler of claim 4, wherein the execution stall signal or interconnect not ready signal is deasserted to one or more execution engines of one or more devices attached to the interconnect when the throttle window time period has passed.

6. A method, comprising:
   counting transactions issued on an interconnect bus once a throttle window time period commences, the interconnect bus coupling a central processing unit, operating at a first performance rate and a first average power, to circuitry of a system, wherein the throttle window time period is an adjustable parameter;
   asserting a signal to the interconnect bus if the transaction count exceeds a maximum value, the transaction count being an adjustable parameter, wherein the signal assertion causes transactions issued on the interconnect bus to cease such that the central processing unit operates at a second performance rate and a second average power, the second performance rate being lower than the first performance rate and the second average power being lower than the first average power; and deasserting the signal if the time period ends, wherein the signal deassertion causes the transactions issued on the interconnect bus to commence such that the circuitry receives the transactions from the central processing unit and the central processing unit again operates at the first performance rate and the first average power.

7. The method of claim 6, further comprising:
not asserting the signal to the interconnect bus if the transaction count does not exceed the maximum value.

8. The method of claim 6, asserting the signal if the transaction count exceeds a maximum value further comprising:
asserting the signal to an execution engine, wherein the signal is an execution stall signal and the signal assertion causes any devices connected to the execution engine to cease operation.

* * * * *

UNITED STATES PATENT AND TRADEMARK OFFICE
CERTIFICATE OF CORRECTION

PATENT NO.         : 8,289,850 B2                                            Page 1 of 1
APPLICATION NO.    : 13/241738
DATED              : October 16, 2012
INVENTOR(S)        : Lance Hacking et al.

It is certified that error appears in the above-identified patent and that said Letters Patent is hereby corrected as shown below:

On the cover page, below "Prior Publication Data",
insert -- Related U.S. Application Data
(63) Continuation of application No. 12/060,157 filed on Mar. 31, 2008, now Pat. No. 8,050,177 --.

In the drawings:
On sheet 6 of 6, in Figure 6, line 2, delete "Bandwith" and insert -- Bandwidth --, therefor.

On sheet 6 of 6, in Figure 6, on Y Axis, line 1, delete "Bandwith" and insert -- Bandwidth --, therefor.

Signed and Sealed this
Nineteenth Day of February, 2013

Teresa Stanek Rea
*Acting Director of the United States Patent and Trademark Office*